US012794600B2

(12) United States Patent
Yan et al.

(10) Patent No.: US 12,794,600 B2
(45) Date of Patent: Nov. 10, 2026

(54) METHOD AND APPARATUS FOR TRANSMISSION OF FEEDBACKS CORRESPONDING TO TRANSPORT BLOCKS

(71) Applicant: LENOVO (BEIJING) LIMITED, Beijing (CN)

(72) Inventors: Zhi Yan, Beijing (CN); Haipeng Lei, Beijing (CN); Jie Shi, Beijing (CN); Yingying Li, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 986 days.

(21) Appl. No.: 17/276,422

(22) PCT Filed: Oct. 16, 2018

(86) PCT No.: PCT/CN2018/110509

§ 371 (c)(1),
(2) Date: Mar. 15, 2021

(87) PCT Pub. No.: WO2020/077539

PCT Pub. Date: Apr. 23, 2020

(65) Prior Publication Data

US 2022/0038219 A1 Feb. 3, 2022

(51) Int. Cl.
*H04L 1/1829* (2023.01)
*H04L 1/1867* (2023.01)
*H04L 5/00* (2006.01)

(52) U.S. Cl.
CPC .......... *H04L 1/1854* (2013.01); *H04L 1/1858* (2013.01); *H04L 1/189* (2013.01); *H04L 5/0055* (2013.01); *H04L 5/0078* (2013.01)

(58) Field of Classification Search
None
See application file for complete search history.

(56) References Cited

U.S. PATENT DOCUMENTS

2015/0092631 A1* 4/2015 Meng .................... H04L 1/1887 370/280
2015/0189546 A1* 7/2015 Earnshaw ............ H04W 72/21 370/329
(Continued)

FOREIGN PATENT DOCUMENTS

CN 103370971 A 10/2013
CN 108282879 A 7/2018
(Continued)

OTHER PUBLICATIONS

3GPP, 3rd Generation Partnership Project; Technical Specification Group Radio Access Network; Updated Feature lead summary Scheduling of multiple DL UL transport blocks in LTE MTC, 3GPP R1-1811680, Oct. 2018, pp. 1-12.
(Continued)

*Primary Examiner* — Suk Jin Kang
(74) *Attorney, Agent, or Firm* — Kunzler Needham Hilton

(57) ABSTRACT

Method and apparatus for transmission of feedbacks corresponding to TBs are disclosed. One method includes determining a transmission timing for a feedback corresponding to a transport block bundle (TBB) of a first number of TBBs, according to at least one of a first transmission timing, which is based on a completed transmission timing of the TBB and a timing offset, a second transmission timing, which is based on a transmission timing for a feedback corresponding to a previous TBB of the TBB, and a third transmission timing, which is based on at least one of a completed transmission timing of a last TBB of the first number of TBBs, the timing offset, a completed transmission timing of the first number of TBBs, a feedback order for the first number of TBBs, and
(Continued)

a transmission repetition number for a feedback; wherein, the TBB includes a second number of TBs, which is a positive integer; and transmitting the feedback corresponding to the TBB of the first number of TBBs according to the determined transmission timing.

14 Claims, 8 Drawing Sheets

(56) References Cited

U.S. PATENT DOCUMENTS

| | | | | |
|---|---|---|---|---|
| 2015/0280876 | A1* | 10/2015 | You | H04L 27/2613 370/329 |
| 2016/0164643 | A1* | 6/2016 | Loehr | H04L 1/189 370/336 |
| 2017/0085360 | A1* | 3/2017 | Lee | H04L 5/0055 |
| 2017/0111145 | A1* | 4/2017 | Höglund | H04L 1/1854 |
| 2018/0092071 | A1* | 3/2018 | Dinan | H04L 1/1819 |
| 2018/0110084 | A1* | 4/2018 | Dinan | H04W 48/12 |
| 2018/0123741 | A1* | 5/2018 | You | H04L 5/0044 |
| 2018/0294926 | A1* | 10/2018 | Loehr | H04L 1/1854 |
| 2019/0053231 | A1* | 2/2019 | Zhang | H04L 1/0003 |
| 2019/0075589 | A1* | 3/2019 | Jeon | H04W 72/0453 |
| 2019/0090219 | A1* | 3/2019 | Lee | H04W 72/30 |
| 2019/0090261 | A1* | 3/2019 | Yang | H04W 72/0446 |
| 2019/0190680 | A1* | 6/2019 | Si | H04L 5/00 |
| 2019/0327027 | A1* | 10/2019 | Webb | H04L 1/08 |
| 2019/0356427 | A1* | 11/2019 | Babaei | H04L 1/1812 |
| 2020/0044781 | A1* | 2/2020 | Rudolf | H04L 5/0007 |
| 2020/0252932 | A1* | 8/2020 | Zhang | H04W 72/0446 |
| 2020/0275422 | A1* | 8/2020 | Babaei | H04L 1/1887 |
| 2021/0022125 | A1* | 1/2021 | Dinan | H04L 1/1822 |
| 2021/0119737 | A1* | 4/2021 | Sagfors | H04L 1/1896 |
| 2021/0219329 | A1* | 7/2021 | Zhou | H04L 1/1819 |
| 2021/0367713 | A1* | 11/2021 | Rudolf | H04L 5/0007 |
| 2022/0022163 | A1* | 1/2022 | Lee | H04W 72/30 |
| 2022/0039143 | A1* | 2/2022 | Guo | H04L 69/28 |
| 2022/0095310 | A1* | 3/2022 | Li | H04L 1/0003 |
| 2022/0095365 | A1* | 3/2022 | Jeon | H04L 1/08 |
| 2022/0216949 | A1* | 7/2022 | Tirronen | H04L 5/0055 |
| 2022/0248382 | A1* | 8/2022 | Dinan | H04W 72/23 |
| 2022/0287034 | A1* | 9/2022 | Zhang | H04W 72/12 |
| 2022/0321282 | A1* | 10/2022 | Cheng | H04W 72/23 |

FOREIGN PATENT DOCUMENTS

| | | |
|---|---|---|
| WO | 2018127628 A1 | 7/2018 |
| WO | 2018145074 A1 | 8/2018 |

OTHER PUBLICATIONS

International Searching Authority, "Notification of Transmittal of the International Search Report and the Written Opinion of the International Searching Authority, or the Declaration", PCT/CN2018/110509, Oct. 16, 2018, pp. 1-6.

* cited by examiner

T1 for A2

| SF# | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|---|---|---|---|---|---|---|---|---|---|---|---|---|---|---|
| MPDCCH | GR | | | | | | | | | | | | | | | | | | | | | | | | | | | | | |
| PDSCH-data | | | | | TB1 | TB1 | TB1 | TB1 | TB2 | TB2 | TB2 | TB2 | TB3 | TB3 | TB3 | TB3 | TB4 | TB4 | TB4 | TB4 | | | | | | | | | | |
| PUCCH-feedback | | | | | | | | | | | | | | | | A1 | A1 | | | A2 | A2 | | | A3 | A3 | | | A4 | A4 | |

n+8

Figure 1A

T2 for A2

| SF# | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|---|---|---|---|---|---|---|---|---|---|---|---|---|---|---|
| MPDCCH | GR | | | | | | | | | | | | | | | | | | | | | | | | | | | | | |
| PDSCH-data | | | | | TB1 | TB1 | TB1 | TB1 | TB2 | TB2 | TB2 | TB2 | TB3 | TB3 | TB3 | TB3 | TB4 | TB4 | TB4 | TB4 | | | | | | | | | | |
| PUCCH-feedback | | | | | | | | | | | | | | | | A1 | A1 | A2 | A2 | A3 | A3 | A4 | A4 | | | | | | | |

n+8

Figure 2A

T3 for A2

| SF# | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|---|
| MPDCCH | GR | | | | | | | | | | | | | | | | | | | | | | | | | | | | | | |
| PDSCH-data | | | | | TB1 | TB1 | TB1 | TB1 | TB2 | TB2 | TB2 | TB2 | TB3 | TB3 | TB3 | TB3 | TB4 | TB4 | TB4 | TB4 | | | | | | | | | | | |
| PUCCH-feedback | | | | | | | | | | | | | | | | | | | | | | A1 | A1 | A2 | A2 | A3 | A3 | A4 | A4 | | |

n+8

Figure 3A

METHOD AND APPARATUS FOR TRANSMISSION OF FEEDBACKS CORRESPONDING TO TRANSPORT BLOCKS

This application claims priority to PCT/CN2018/110509 filed on Oct. 16, 2018.

FIELD

The subject matter disclosed herein relates generally to wireless communication and more particularly relates to transmission of feedbacks corresponding to transport block(s).

BACKGROUND

The following abbreviations and acronyms are herewith defined, at least some of which are referred to within the following description.

Third Generation Partnership Project ("3GPP"), Cyclic redundancy check ("CRC"), Downlink Control Information ("DCI"), Downlink ("DL"), Downlink Pilot Time Slot ("DwPTS"), Evolved Node B ("eNB"), 5G Node B ("gNB"), European Telecommunications Standards Institute ("ETSI"), Frequency Division Duplex ("FDD"), Frequency-Division Multiplexing ("FDM"), Frequency Division Multiple Access ("FDMA"), Hybrid Automatic Repeat Request ("HARQ"), Hybrid Automatic Repeat Request-Positive Acknowledgement ("HARQ-ACK"), Hybrid Automatic Repeat Request-Negative Acknowledgement ("HARQ-NACK"), Information Element ("IE"), Long Term Evolution ("LTE"), LTE Advanced ("LTE-A"), Media Access Control ("MAC"), Master Information Block ("MIB"), Machine Type Communication ("MTC"), MTC physical downlink control channel ("MPDCCH"), Narrow Band Internet of Things ("NB-IoT"), Narrow Band-Physical Uplink Control Channel ("NPDCCH"), New Radio ("NR"), Physical control format indicator channel ("PCFICH"), Physical Downlink Shared Channel ("PDSCH"), Physical hybrid ARQ indicator channel ("PHICH"), Physical Uplink Control Channel ("PUCCH"), Physical Uplink Shared Channel ("PUSCH"), Quadrature Phase Shift Keyin ("QPSK"), Quadrature amplitude modulation ("QAM"), Radio Resource Control ("RRC"), Received Signal Strength Indicator ("RSSI"), Reference Signal Received Power ("RSRP"), Reference Signal Received Quality ("RSRQ"), Receive ("RX"), Radio Network Temporary Identifier ("RNTI"), Redundancy Version ("RV"), Single Cell Point to Multipoint System ("SC-PTM"), Information Block ("SIB"), Transport Block ("TB"), Time Division Duplex ("TDD"), Time-Division Multiplexing ("TDM"), Transmit ("TX"), User Entity/Equipment (Mobile Terminal) ("UE"), Uplink ("UL"), Universal Mobile Telecommunications System ("UMTS").

MTC is expected to play an essential role within future 5G systems. It has been identified as an important use-case for 5G NR wireless technology. Applications of this type are characterized by huge volumes of end-points and connections, using low-cost devices and modules for wireless sensor networks, connected homes, smart metering and so on. It is expected that a new network is able to handle significantly more connections efficiently, which is prompting the development of new technologies to support Bandwidth Reduced Low Complexity/Coverage Enhancement (BL/CE) UEs.

NB-IoT is a standards-based low power wide area (LPWA) technology developed to enable a wide range of new IoT devices and services. NB-IoT significantly improves the power consumption of user devices, system capacity and spectrum efficiency. More than 10 years of battery life can be supported for a wide range of use cases.

Similar with mechanisms for scheduling a transport block in LTE, special DCI formats are used to schedule a DL/UL transport block for eMTC/NB-IoT UEs. For example, DCI formats 6-0A/6-0B are used to indicate UL grant for eMTC CE mode A and CE mode B UE respectively, and DCI format 6-1A/6-1B is used to indicate transmission configuration/scheduling of DL transport blocks. In another example, DCI format NO is used to indicate UL grant for NB-IoT UE, and DCI format N1 is used to indicate the transmission configuration/scheduling of DL transport blocks.

Particularly, in the RAN 80 plenary meeting of 3GPP, new work items for Rel.16 eMTC/NB-IoT are approved. In the RANI 94 meeting of 3GPP, study on scheduling multiple TBs with single DCI is encouraged. Correspondingly, transmission of feedbacks corresponding to the multiple TBs also needs to be studied.

BRIEF SUMMARY

It is expected that the feedbacks corresponding to the multiple DL transport blocks can be transmitted with high resource utilization and reduced delay. However, besides invalid subframes unsuitable for the transmission of TB or the corresponding feedback, the imbalance between the transmission repetition number for a TB and the corresponding feedback may cause a waste of resource. Thereby, a transmission timing for a feedback corresponding to a TB of the multiple TBs should be further studied in order to transmit the feedback in an efficient way.

The method and apparatus for transmission of feedbacks corresponding to TBs includes determining a transmission timing for a feedback corresponding to a transport block bundle(TBB) of a first number of TBBs, according to at least one of a first transmission timing, which is based on a completed transmission timing of the TBB and a timing offset, a second transmission timing, which is based on a transmission timing for a feedback corresponding to a previous TBB of the TBB, and a third transmission timing, which is based on at least one of a completed transmission timing of a last TBB of the first number of TBBs, a completed transmission timing of the first number of TBBs, the timing offset, a feedback order for the first number of TBBs, and a transmission repetition number for a feedback; wherein, the TBB includes a second number of TBs, which is a positive integer; and transmitting the feedback corresponding to the TBB of the first number of TBBs according to the determined transmission timing.

The method and apparatus disclosed herein provides transmission mechanisms for feedbacks corresponding to the multiple transport blocks by the designed transmission timing for the feedbacks, thereby the feedbacks corresponding to the multiple transport blocks are transmitted with high resource utilization and reduced delay.

BRIEF DESCRIPTION OF THE DRAWINGS

A more particular description of the embodiments briefly described above will be rendered by reference to specific embodiments illustrated in the appended drawings. Given that these drawings depict only some embodiments and are not therefore considered to be limiting in scope, the embodiments will be described and explained with additional specificity and detail through the use of the accompanying drawings, in which:

FIGS. 1A-1D are schematic diagrams illustrating transmission timing for a feedback corresponding to a transport block bundle (TBB) according to the first embodiment of the present application;

FIGS. 2A-2B are schematic diagrams illustrating transmission timing for a feedback corresponding to a TBB according to the second embodiment of the present application;

FIGS. 3A-3B are schematic diagrams illustrating transmission timing for a feedback corresponding to a TBB according to the third embodiment of the present application;

DETAILED DESCRIPTION

Figure 1B:
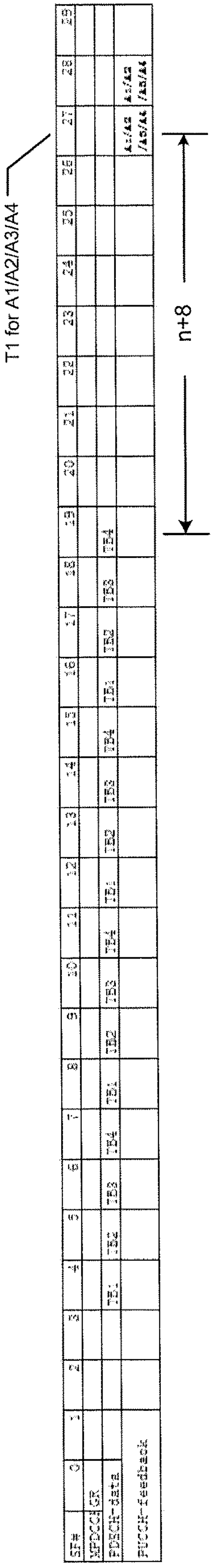

As will be appreciated by one skilled in the art, aspects of the embodiments may be embodied as a system, apparatus, method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, one or more embodiments may take the form of a program product embodied in one or more computer readable storage devices storing machine readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but is not limited to being, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but not limited to", unless expressly specified otherwise. An enumerated listing of items does not imply that any or all of the items are mutually exclusive, unless expressly specified otherwise. The terms "a", "an", and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions—executed via the processor of the computer or other programmable data processing apparatus—create a means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code executed on the computer or other programmable apparatus provides processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function (s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved. Other steps and methods may be conceived that are equivalent in function, logic, or effect to one or more blocks, or portions thereof, to the illustrated Figures.

The description of elements in each figure may refer to elements of proceeding figures. Like-numbers refer to like-elements in all figures, including alternate embodiments of like-elements.

Figure 1C:
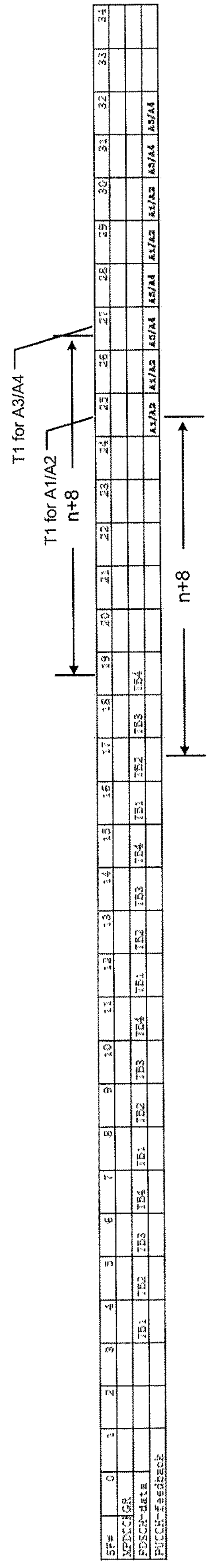
Figure 1D:
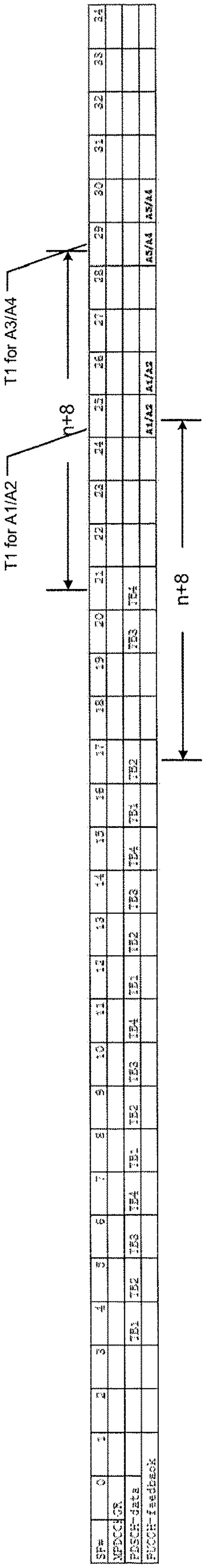

FIGS. 1A-1D are schematic diagrams illustrating transmission timing for a feedback corresponding to a transport block bundle (TBB) according to the first embodiment of the present application. Particularly, FIG. 1A is a schematic diagram illustrating transmission timing for a feedback corresponding to a TBB including one TB, FIGS. 1B-1D are schematic diagrams illustrating transmission timing for a feedback corresponding to a TBB including at least two TBs. In can be expressed in another way that a first number N1 of TBBs being transmitted from a network equipment are scheduled by DCI ("GR" shown in Figures), and a TBB is composed of a second number N2 of TBs, wherein the N2 is a positive integer. Thereby, the total number of independent TBs scheduled by DCI is N1×N2.

As shown in FIG. 1A, the first row (SF #) indicates the indices of subframes.

The second row (MPDCCH) indicates a subframe where a downlink scheduling (GR) is received. As shown in FIG. 1A, the downlink scheduling over MPDCCH is received in subframe 0 by UE. UE will receive DL transmission in a certain number of subframes; for example, #n+4 subframes, subsequent to the subframe #n in which the downlink scheduling was received. It should be understood that although it is shown that the duration between the subframe for PDSCH transmission and that for the downlink scheduling is four subframes in FIG. 1A, this is not a limitation.

The third row (PDSCH-data) in FIG. 1A indicates subframes in which TBs will be received. As shown in FIG. 1A, there are a total of four TBs—TB1, TB2, TB3 and TB4—transmitted in valid subframes. Each of the four TBs is transmitted four times, as a transmission repetition number for a TB is equal to four.

The fourth row (PUCCH-feedback) indicates subframes in which the feedbacks corresponding to the TBs will be transmitted. The feedbacks of A1, A2, A3 and A4 indicate decoding results for the four TBs of TB1-TB4 shown in the third row, respectively. Particularly, a feedback of a positive acknowledgment (ACK) indicates a correct decoding result for the corresponding TB; a feedback of a negative acknowledgement (NACK) indicates an incorrect decoding result for the corresponding TB. As shown in FIG. 1A, a timing offset between the transmission timing of a TB and a corresponding feedback is 8 subframes, however this is not a limitation. In the case of eMTC, the timing offset is predefined as 8 subframes. In the case of NB-IOT, the timing offset is indicated by DCI. For example, TB1 from a network equipment is completely transmitted in subframe 7, thereby the corresponding feedbacks thereof, i.e. A1, are transmitted in subframes 15 and 16, in which a transmission repetition number for a feedback is equal to two.

Taking a TB2 as another example, TB2 from a network equipment is completely transmitted in subframe 11, thereby the corresponding feedbacks thereof, i.e. A2, are transmitted from the first transmission timing T1, i.e. subframe 19. It can be seen that the transmission timing for a feedback corresponding to the TBB (for example, TB2) is determined according to the first transmission timing T1, which is based on the completed transmission timing of the TBB (for example, TB2) and the timing offset of 8 subframes, wherein the TBB includes one TB in the embodiment shown in FIG. 1A. However, there are two idle subframes (e.g. subframes 17 and 18) between the last feedback A1 (corresponding to TB1) and the first feedback A2 (corresponding to TB2). As known to one skilled in the relevant art, these idle subframes usually cannot be scheduled to other UEs, thereby sometimes a smaller transmission repetition number for a feedback than the transmission repetition number for a TB may cause a waste of resources.

As shown in FIG. 1A, the feedback indicates a decoding result for a single TB which is repeatedly transmitted four times. In another word, the TBB includes one TB in FIG. 1A. Additionally, given that there are four TBs scheduled by DCI in total, the first number N1 is equal to four, while the second number N2 is equal to one in FIG. 1A.

In another aspect, a feedback can indicate decoding results for at least two TBs. In this case, the feedback is also referred to as a "feedback bundle" corresponding to the TBB herein.

FIG. 1B is a schematic diagram illustrating transmission timing for a feedback corresponding to a TBB including four TBs—i.e. TB1-TB4. That is, the second number N2 is equal to four. As shown in FIG. 1B, because there are the four TBs transmitted from the network equipment in total, the first number N1 is equal to one. The first row to the third row in FIG. 1B have similar definitions with those of FIG. 1A, thereby the description thereof is omitted for the purpose of brevity. Additionally, it is noted that the TBs are transmitted in an interleaving way, thereby the completed transmission timing of the TBs 1-4 is subframes 16-19, respectively.

As shown in FIG. 1B, the feedback bundle shown as A1/A2/A3/A4 in FIG. 1B indicates decoding results for TB1, TB2, TB3 and TB4. In one embodiment, the feedback bundle is determined by AND operation of feedbacks corresponding to the TBs of the TBB. Particularly, the feedback bundle is determined by AND operation of A1, A2, A3 and A4, which are feedbacks corresponding to TB1, TB2, TB3 and TB4, respectively. In the case that all of the four TBs are decoded correctly, the feedback bundle will be a positive acknowledgement. Otherwise, the feedback bundle will be a negative acknowledgement.

In another aspect, the feedback bundle A1/A2/A3/A4 is transmitted from subframe 27, which is based on a completed transmission timing of the TBB (i.e. subframe 19) and the timing offset of 8 subframes.

FIG. 1C is a schematic diagram illustrating transmission timing for a feedback corresponding to a TBB including two TBs—i.e. the first TBB composed of TB1 and TB2, or the second TBB composed of TB3 and TB4. That is, the second number N2 is equal to two. As shown in FIG. 1C, because there are four TBs transmitted from the network equipment in total, the four TBs are divided into two bundles. That is, the first number N1 is equal to two. The first row to the third row in FIG. 1C have similar definitions with those of FIG. 1A, thereby the description thereof is omitted for the purpose of brevity. Additionally, it is noted that the TBs are transmitted in an interleaving way, thereby the completed transmission timing of the TBs 1-4 is subframes 16-19, respectively.

As shown in FIG. 1C, the feedback bundle shown as A1/A2 or A3/A4 in FIG. 1C indicates decoding results for TB1 and TB2, or TB3 and TB4, respectively. Particularly, the feedback bundle A1/A2 is transmitted from subframe 25, which is based on a completed transmission timing of the first TBB (i.e. subframe 17) and the timing offset of 8 subframes. The feedback bundle A3/A4 is transmitted from subframe 27, which is based on a completed transmission timing of the second TBB (i.e. subframe 19) and the timing offset of 8 subframes. In another aspect, the transmission repetition number for a feedback is equal to four, thereby the remaining two feedback bundles A1/A2 are transmitted in subframes 29 and 30, following the two feedback bundles A3/A4 in subframes 27 and 28 in an interleaved feedback transmission pattern.

In one embodiment, the feedback bundle is determined by AND operation of feedbacks corresponding to the TBs of the TBB. Particularly, the first feedback bundle A1/A2 is determined by AND operation of A1 and A2, which are feedbacks corresponding to TB1 and TB2, respectively. In the case that both of the two TBs are decoded correctly, the feedback bundle will be a positive acknowledgement. Otherwise, the feedback bundle will be a negative acknowledgement. Similarly, the second feedback bundle A3/A4 is determined by AND operation of A3 and A4, which are feedbacks corresponding to TB3 and TB4, respectively.

In another embodiment, the feedback bundle is determined by modulation operation of feedbacks corresponding to the TBs of the TBB, wherein a modulation factor is based on the second number of TBs. Particularly, the first feedback bundle A1/A2 is determined by modulation operation of A1 and A2, which are feedbacks corresponding to TB1 and TB2, respectively. Since the TBB includes two TBs (the second number N2=2), the modulation factor is two, then the modulation operation of A1 and A2 is QPSK. Similarly, the second feedback bundle A3/A4 is determined by QPSK operation of A3 and A4, which are feedbacks corresponding to TB3 and TB4, respectively.

In yet another embodiment, the feedback bundle is determined by a sequence based on feedbacks corresponding to the TBs of the TBB. Particularly, the first feedback bundle A1/A2 is determined by a sequence based on A1 and A2, which are feedbacks corresponding to TB1 and TB2, respectively. For example, in the case that both TB1 and TB2 are decoding correctly, the sequence would be [1 1 . . . 1]. In the case that TB1 is decoding correctly and TB is decoding incorrectly, the sequence would be [1 0 1 0 . . . 1 0]. In the case that TB1 is decoding incorrectly and TB is decoding correctly, the sequence would be [0 1 0 1 . . . 0 1]. In the case that both TB1 and TB2 are decoding incorrectly, the sequence would be [0 0 . . . 0]. Similarly, the second feedback bundle A3/A4 is determined by a sequence based on A3 and A4, which are feedbacks corresponding to TB3 and TB4, respectively.

FIG. 1D is a schematic diagram illustrating transmission timing for a feedback corresponding to a TBB including two TBs—i.e. the first TBB composed of TB1 and TB2, or the second TBB composed of TB3 and TB4. That is, the second number N2 is equal to two. As shown in FIG. 1D, because there are four TBs transmitted from the network equipment in total, the four TBs are divided into two bundles. That is, the first number N1 is equal to two. The first row to the third row in FIG. 1D have similar definitions with that shown in FIG. 1A, thereby the description thereof is omitted for the purpose of brevity. Additionally, it is noted that the TBs are transmitted in an interleaving way, and moreover subframes 18 and 19 are invalid frames which are not suitable for the transmission of TBs, thereby the completed transmission timing of the TBs 1-4 is subframes 16, 17, 20 and 21, respectively.

As shown in FIG. 1D, the feedback bundle shown as A1/A2 or A3/A4 in FIG. 1D indicates decoding results for TB1 and TB2, or TB3 and TB4, respectively. Particularly, the feedback bundle A1/A2 is transmitted from subframe 25, which is based on a completed transmission timing of the first TBB (i.e. subframe 17) and the timing offset of 8 subframes. The feedback bundle A3/A4 is transmitted from subframe 29, which is based on a completed transmission timing of the second TBB (i.e. subframe 21) and the timing offset of 8 subframes. It is noted that there are two idle subframes between the last feedback bundle A1/A2 transmitted in subframe 26 and the first feedback bundle A3/A4 transmitted in subframe 29. As known to one skilled in the relevant art, these idle subframes usually cannot be applied for other UEs, thereby the existence of invalid subframes may cause a waste of resources.

As mentioned above for FIG. 1C, the feedback bundle is determined by one or more of the following: AND operation of, modulation operation of, and a sequence based on feedbacks corresponding to the TBs of the TBB. Particularly, the first feedback bundle A1/A2 is determined by one or more of the following: AND operation of, modulation operation of, and a sequence based on feedbacks A1 and A2. The second feedback bundle A3/A4 is determined by one or more of the following: AND operation of, modulation operation of, and a sequence based on feedbacks A3 and A4. The examples of determination of feedback bundle are similar with that depicted in FIG. 1C, thereby the description thereof is omitted for the purpose of brevity.

In one embodiment, in order to increase the availability and robustness for the transmission of the feedback bundles, especially in the case that the feedback bundle corresponds to the TBB includes at least two TBs, the transmission repetition number for a feedback, which is configured by higher layer signaling (for example, a field of pucch-NumRepetitionCE-r13), can be scaled according to the number of TBs included in a TBB, i.e. the second number N2. Taking the transmission of feedback bundles shown in FIG. 1B as an example, the final transmission repetition number for a feedback would be equal to 8, given that the indicated transmission repetition number by higher layer for a feedback (e.g. pucch-NumRepetitionCE-r13) is equal to 2 and the TBB includes 4 TBs (N2=4). Taking the transmission of feedback bundles shown in FIG. 1C or 1D as an example, the final transmission repetition number for a feedback would be equal to 4, given that the indicated transmission repetition number by higher layer for a feedback is equal to 2 and the TBB includes 2 TBs (N2=2).

Figure 2B:
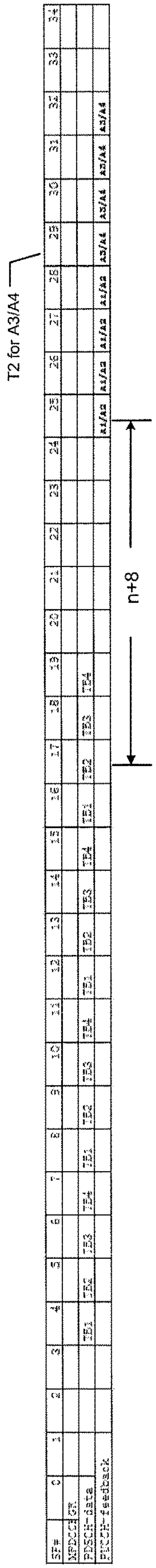

FIGS. 2A-2B are schematic diagrams illustrating transmission timing for a feedback corresponding to a TBB according to the second embodiment of the present application. Particularly, FIG. 2A is a schematic diagram illustrating transmission timing for a feedback corresponding to a TBB including one TB. FIG. 2B is a schematic diagrams illustrating transmission timing for a feedback corresponding to a TBB including two TBs. The first row to the third row in FIG. 2A or 2B have similar definitions with those of FIG. 1A, thereby the description thereof is omitted for the purpose of brevity.

As shown in FIG. 2A, each of the feedbacks is transmitted twice, so the transmission repetition number for a feedback is equal to two. The feedback A1 is completely transmitted in subframe 16, so the feedback A2 is transmitted from subframe 17. It can be seen that the transmission timing for a feedback is determined according to the second transmission timing T2, which is based on a transmission timing for a feedback corresponding to a previous TBB (for example, TB1) of the TBB (for example, TB2), wherein the TBB includes one TB in the embodiment shown in FIG. 2A.

FIG. 2B is a schematic diagram illustrating transmission timing for a feedback corresponding to a TBB including two TBs—i.e. the first TBB composed of TB1 and TB2, or the second TBB composed of TB3 and TB4. That is, the second number N2 is equal to two. As shown in FIG. 2B, because there are four TBs transmitted from the network equipment in total, the four TBs are divided into two bundles. That is, the first number N1 is equal to two. Additionally, it is noted that the TBs are transmitted in an interleaving way; thereby the completed transmission timing of the TBs 1-4 is subframes 16-19, respectively.

As shown in the fourth row of FIG. 2B, the first feedback bundle is transmitted from subframe 25, which is determined based on the completed transmission timing of first TBB (including TB1 and TB2) in subframe 17 and the timing offset of 8 subframes. Therefore, the first feedback bundle is completely transmitted in subframe 28, given that the transmission repetition number for a feedback is equal to 4. Consequently, the second feedback bundle is transmitted from subframe 29, which is next to the transmission timing of the first feedback bundle corresponding to the first TBB. It can be seen that the transmission timing for a feedback bundle is determined according to the second transmission timing T2, which is based on a transmission timing for a feedback bundle timing corresponding to a previous TBB (for example, the first TBB composed of TB1 and TB2) of the TB (for example, the second TBB composed of TB3 and TB4).

It should be noted that although the waste of resources is avoided in the second embodiment, the transmission advancement for the feedback (bundle) is introduced as shown in FIG. 2A, which may result in an inadequate duration for decoding the corresponding TBB. Alternatively, the transmission delay for the feedback (bundle) is introduced as shown in FIG. 2B, which is not expected by the network equipment as a receiving party.

Figure 3B:
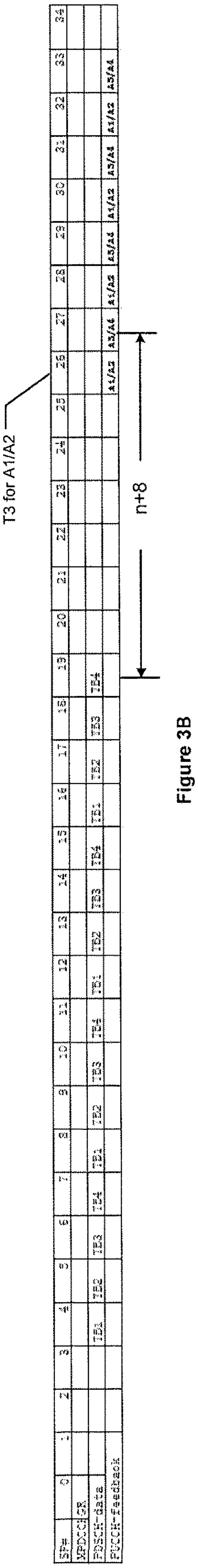

FIGS. 3A-3B are schematic diagrams illustrating transmission timing for a feedback corresponding to a TBB according to the third embodiment of the present application. Particularly, either FIG. 3A is a schematic diagram illustrating transmission timing for a feedback corresponding to a TBB including one TB. FIG. 3B is a schematic diagrams illustrating transmission timing for a feedback corresponding to a TBB including two TBs. The first row to the third row in FIGS. 3A-3B have similar definitions with those of FIG. 1A, thereby the description thereof is omitted for the purpose of brevity.

As shown in FIG. 3A, the feedback A4 corresponding to TB4 is transmitted from subframe 27, which is determined based on the completed transmission timing of TB4 in subframe 19 and the timing offset of 8 subframes. In another aspect, subframe 19 is also the completed transmission timing of the fourth independent TBs. Given that the transmission repetition number for a feedback is equal to two and the feedback order is [A1 A2 A3 A4], in which the feedbacks are transmitted in a non-interleaving way, the feedback A1 corresponding to TB1 is transmitted in subframes 21 and 22. It is noted that the transmission timing for feedback A1 (i.e. subframe 21) is derived by the transmission timing for feedback A4 (i.e. subframe 27) minus a product of the transmission repetition number for a feedback (i.e. 2) and an order offset to the last feedback based on the feedback order (i.e. 3). Accordingly, the feedback A2 corresponding to TB2 is transmitted from subframe 23, which is derived by the transmission timing for feedback A4 (i.e. subframe 27) minus a product of the transmission repetition number for a feedback (i.e. 2) and an order offset to the last feedback based on the feedback order (i.e. 2).

It can be seen that the transmission timing of a feedback corresponding to a TBB is determined according to a third transmission timing T3, which is based on at least one of a completed transmission timing of the last TBB (i.e. TB4) of the scheduled independent TBBs, the timing offset, a completed transmission timing of the scheduled independent TBBs, a feedback order for the scheduled independent TBBs, and a transmission repetition number for a feedback, wherein the TBB includes one TB in the embodiments shown in FIG. 3A.

FIG. 3B is a schematic diagram illustrating transmission timing for a feedback corresponding to a TBB including two TBs—i.e. the first TBB composed of TB1 and TB2 or the second TBB composed of TB3 and TB4. That is, the second number N2 is equal to two. As shown in FIG. 3B, because there are four TBs transmitted from the network equipment in total, the four TBs are divided into two bundles. That is, the first number N1 is equal to two. Additionally, it is noted that the TBs are transmitted in an interleaving way, thereby the completed transmission timing of TBs 1-4 is subframes 16-19, respectively.

As shown in FIG. 3B, the last TBB (i.e. the second TBB composed of TB3 and TB4) of the two independent TBBs is transmitted in subframe 19, which is also the completed transmission timing of the two independent TBBs. Correspondingly, the feedback bundle A3/A4 corresponding to the second TBB composed of TB3 and TB4 is transmitted from subframe 27, which is determined based on the completed transmission timing of TB4 in subframe 19 and the timing offset of 8 subframes. Given that the feedback bundle order for the first and second TBB is [A1/A2 A3/A4 A1/A2 A3/A4 A1/A2 A3/A4 A1/A2 A3/A4], in which the feedback bundles are transmitted in an interleaving way and the transmission repetition number for a feedback (bundle) is equal to one for an interleaving round of [A1/A2 A3/A4], the feedback bundle A1/A2 corresponding to the first TBB composed of TB1 and TB2 is transmitted in subframe 26, which is derived by the transmission timing for feedback A3/A4 (i.e. subframe 27) minus a product of the transmission repetition number for a feedback (i.e. 1) and an order offset to the last feedback based on the feedback order (i.e. 1).

It can be seen that the transmission timing of a feedback corresponding to a TBB is determined according to the third transmission timing T3, which is based on at least one of a completed transmission timing of a last TBB (i.e. the second TBB composed of TB3 and TB4) of the scheduled independent TBBs, the timing offset, a completed transmission timing of the scheduled independent TBBs, a feedback order for the scheduled independent TBBs, and a transmission repetition number for a feedback.

Figure 4A:
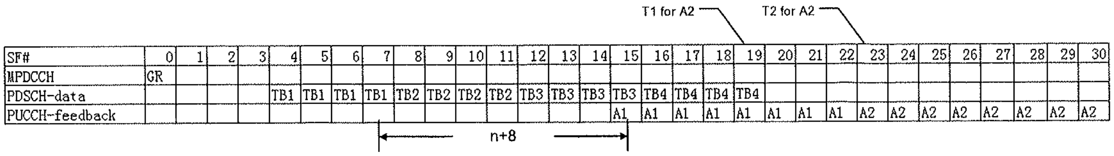
FIG. 4A is a schematic diagram illustrating transmission timing for a feedback corresponding to a TBB according to the fourth embodiment of the present application.

FIG. 4A is a schematic diagram illustrating transmission timing for a feedback corresponding to a TBB according to the fourth embodiment of the present application. The first row to the third row in FIG. 4A have similar definitions with those of FIG. 1A, thereby the description thereof is omitted for the purpose of brevity. It is noted that each of the feedbacks is transmitted eight times, i.e. the transmission repetition number for a feedback is equal to 8. Therefore, feedback A1 corresponding to TB1 is transmitted from subframe 15 to subframe 22.

Taking TB2 as an example, the first transmission timing T1 for the feedback A2, which is based on a completed transmission timing of the TB2 (i.e. subframe 11) and a timing offset of 8 subframes, is subframe 19. The second transmission timing T2 for feedback A2, which is based on a transmission timing for feedback A1 corresponding to a previous TBB (i.e. TB1) of the TB2, is subframe 23.

It can be seen that the transmission timing for a feedback corresponding to the TBB is determined based on the later one of the first transmission timing T1 and the second transmission timing T2, wherein the TBB includes one TB in the embodiment shown in FIG. 4A, but this is not a limitation. So in this embodiment, the transmission timing of the feedback A2 corresponding to the TB2 is subframe 23, which is the later one of T1 and T2. In another embodiment, which is not shown in the figures, the transmission timing for a feedback corresponding to the TBB is determined based on the earlier one of the first transmission timing T1 and the second transmission timing T2. For example, in the embodiment shown in FIG. 4A, the feedback A2 can be transmitted from the first transmission timing T1, i.e. subframe 19.

Figure 4B:
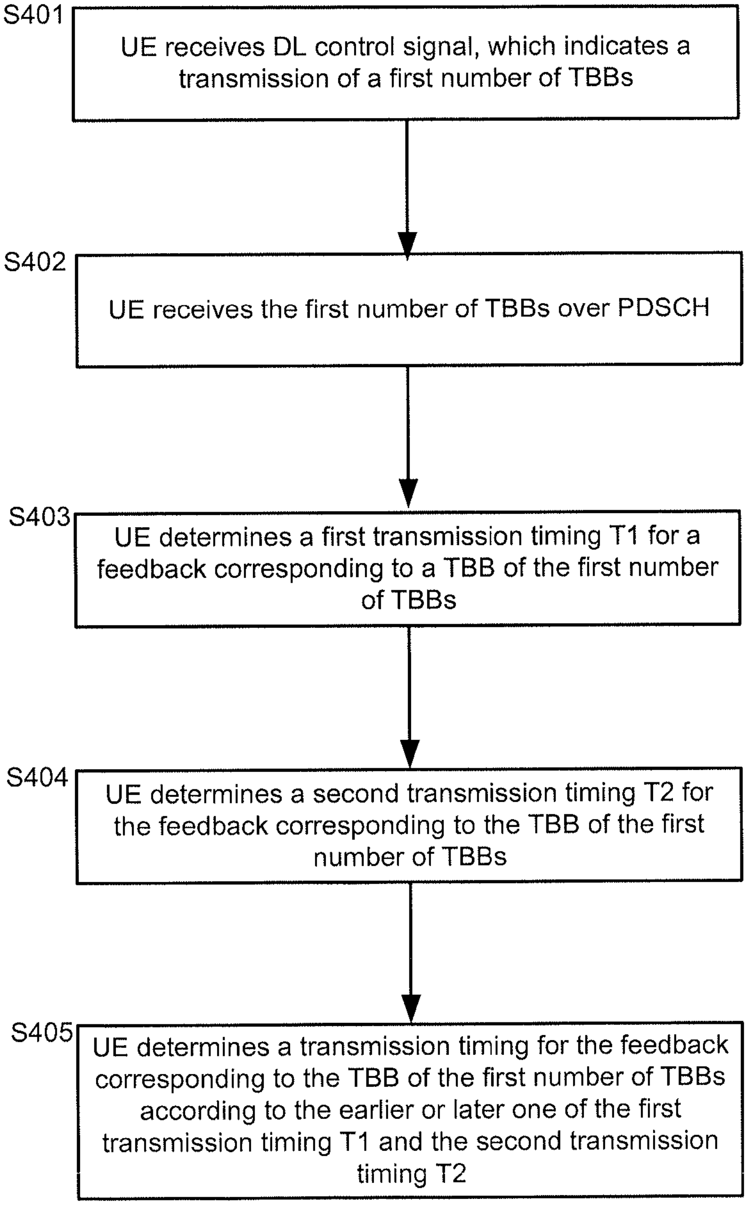
FIG. 4B is a call flow illustrating determination of transmission timing for a feedback corresponding to a TBB according to the fourth embodiment of the present application.

FIG. 4B is a call flow illustrating the determination of the transmission timing for a feedback corresponding to a TBB according to the fourth embodiment of the present application.

As shown in FIG. 4B, in step S401, UE receives DL control information (i.e. GR shown in Figures), which indicates the transmission of the first number of TBBs, i.e. N1 mentioned above. Taking the schematic diagram shown in FIG. 4A as an example, UE receives a DL control signal in subframe 0, which indicates the four TBs, i.e. TBs 1-4, is to be transmitted in subframe 4.

In step S402, UE receives the first number of TBBs over PDSCH as expected. Taking the schematic diagram shown in FIG. 4A as an example, UE receives the scheduled TBs from subframe 4.

In step S403, UE determines a first transmission timing T1 for a feedback corresponding to a TBB of the first number of TBBs, which is based on the completed transmission timing of the TBB and a timing offset. Taking the schematic diagram shown in FIG. 4A as an example, UE determines the first transmission timing T1 for feedback A2 corresponding to TB2 of the four TBs, based on the completed transmission timing of TB2 and the timing offset of 8 subframes.

In step S404, UE determines the first transmission timing T2 for a feedback corresponding to a TBB of the first number of TBBs, which is based on a feedback corresponding to a previous TBB of the TBB. Taking the schematic diagram shown in FIG. 4A as an example, UE determines the first transmission timing T2 for feedback A2 corresponding to TB2 of the four TBs, based on the transmission timing for feedback A1 corresponding to a previous TBB (i.e. TB1) of the TB2.

In step S405, UE determines the transmission timing for the feedback corresponding to the TBB of the first number of TBBs according to either the earlier or later one of the first transmission timing T1 and the second transmission timing T2. Taking the schematic diagram shown in FIG. 4A as an example, in the case that the later one of the first transmission timing T1 and the second transmission timing T2 is determined as the transmission timing for the feedback A2 corresponding to TB2, the feedback A2 is transmitted from subframe 23. In the case that the earlier one of the first transmission timing T1 and the second transmission timing T2 is determined as the transmission timing for the feedback A2 corresponding to TB2, the feedback A2 is transmitted from subframe 19.

Figure 5A:
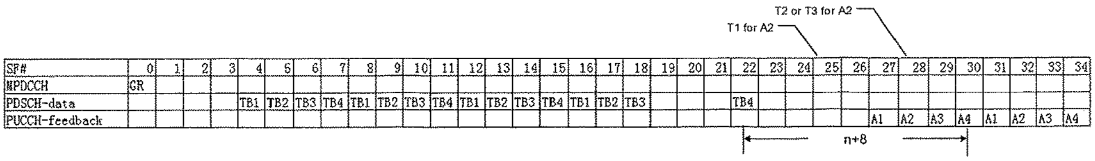
FIG. 5A is a schematic diagram illustrating transmission timing for a feedback corresponding to a TBB according to the fifth embodiment of the present application.

FIG. 5A is a schematic diagram illustrating transmission timing for a feedback corresponding to a TBB according to the fifth embodiment of the present application. The first row to the third row in FIG. 5A have similar definitions with those of FIG. 1A, thereby the description thereof is omitted for the purpose of brevity. It is noted that feedbacks are transmitted in an interleaving way.

Taking TB2 as an example, the first transmission timing T1 for the feedback A2, which is based on a completed transmission timing of the TB2 (i.e. subframe 17) and a timing offset of 8 subframes, is subframe 25. The second transmission timing T2 for the feedback A2, which is based on the transmission timing for feedback A1 corresponding to a previous TBB (i.e. TB1) of the TB2, is subframe 28. Further, given that the last TB of the four TBs, i.e. TB4, is completely transmitted in subframe 22, the feedback thereof is transmitted in the timing offset of 8 subframes later, i.e. in subframe 30. Given that feedback order for the fourth independent TBs is [A1 A2 A3 A4 A1 A2 A3 A4], in which the feedbacks are transmitted in an interleaving way and the transmission repetition number for a feedback is equal to one for an interleaving round of [A1 A2 A3 A4], the third transmission timing T3 for feedback A2 is also subframe 28.

It can be seen that the transmission timing for a feedback corresponding to the TBB is determined based on the latest one of the first transmission timing T1, the second transmission timing T2, and the third transmission timing T3, wherein the TBB includes one TB in the embodiment shown in FIG. 5A, but this is not a limitation. In another embodiment, which is not shown in figures, the transmission timing for a feedback corresponding to the TBB is determined based on the earliest one of the first transmission timing T1, the second transmission timing T2, and the third transmission timing T3. For example, in the embodiment shown in FIG. 5A, the feedback A2 can be transmitted from the first transmission timing T1, i.e. subframe 25.

Figure 5B:
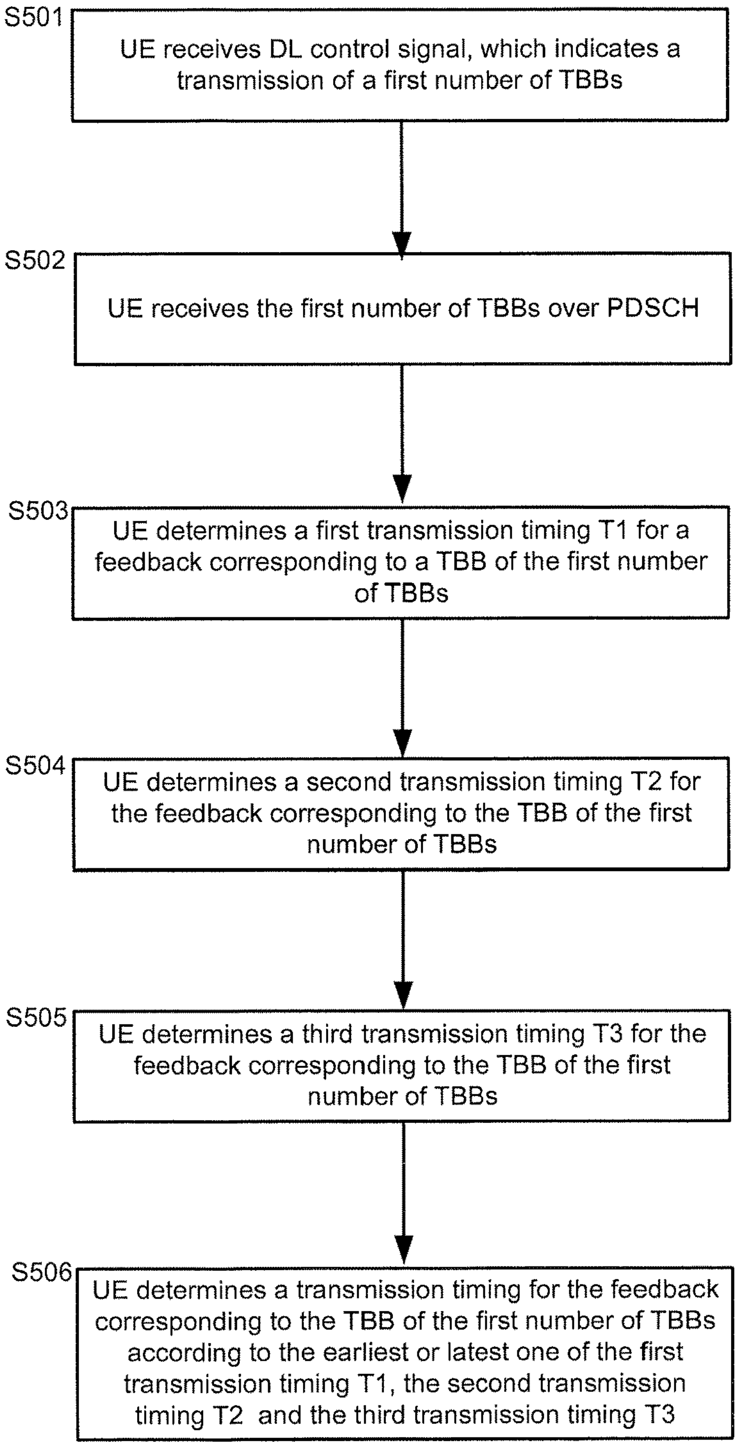
FIG. 5B is a call flow illustrating determination of transmission timing for a feedback corresponding to a TBB according to the fifth embodiment of the present application.

FIG. 5B is a call flow illustrating determination of transmission timing for a feedback corresponding to a TBB according to the fifth embodiment of the present application.

As shown in FIG. 5B, in step S501, UE receives DL control information (i.e. GR shown in Figures), which indicates the transmission of a first number of TBBs, i.e. N1 mentioned above. Taking the schematic diagram shown in FIG. 5A as an example, UE receives a DL control signal in subframe 0, which indicates the four TBs, i.e. TBs 1-4, is to be transmitted in subframe 4.

In step S502, UE receives the first number of TBBs over PDSCH as expected. Taking the schematic diagram shown in FIG. 5A as an example, UE receives the scheduled TBs from subframe 4.

In step S503, UE determines a first transmission timing T1 for a feedback corresponding to a TBB of the first number of TBBs, which is based on a completed transmission timing of the TBB and a timing offset. Taking the schematic diagram shown in FIG. 5A as an example, UE determines the first transmission timing T1 for the feedback A2 corresponding to TB2 of the four TBs, based on the completed transmission timing of the TB2 and the timing offset of 8 subframes.

In step S504, UE determines a first transmission timing T2 for a feedback corresponding to a TBB of the first number of TBBs, which is based on a feedback corresponding to a previous TBB of the TBB. Taking the schematic diagram shown in FIG. 5A as an example, UE determines the first transmission timing T2 for the feedback A2 corresponding to TB2 of the four TBs, based on the transmission timing for feedback A1 corresponding to previous TBB (i.e. TB1) of the TB2.

In step S505, UE determines a third transmission timing T3 for a feedback corresponding to a TBB of the first number of TBBs, which is based on at least one of a completed transmission timing of a last TBB of the first number of TBBs, the timing offset, a completed transmission timing of the first number of TBBs, a feedback order for the first number of TBBs, and a transmission repetition number for a feedback. Taking the schematic diagram shown in FIG. 5A as an example, UE determines the third transmission timing T3 for the feedback A2 corresponding to TB2 of the four TBs, based on at least one of a completed transmission timing of TB4, the timing offset, a feedback order for the fourth TBs, and a transmission repetition number for a feedback.

In step S506, UE determines a transmission timing for the feedback corresponding to the TBB of the first number of TBBs according to the earliest or latest one of the first transmission timing T1, the second transmission timing T2 and the third transmission timing T3. Taking the schematic diagram shown in FIG. 5A as an example, in the case that the latest one of the first transmission timing T1, the second transmission timing T2 and the third transmission timing T3 is determined as the transmission timing for feedback A2 corresponding to TB2, feedback A2 is transmitted from subframe 28. In the case that the earliest one of the first transmission timing T1, the second transmission timing T2 and the third transmission timing T3 is determined as the transmission timing for feedback A2 corresponding to TB2, feedback A2 is transmitted from subframe 25.

It should be understood that although call flows for the receipt of TBs at the UE side are illustrated according to the embodiments of the present application, it should be understood that the network equipment receives the feedbacks from UE by a similar process. Particularly, the network equipment determines transmission timing for a feedback corresponding to a transport block bundle(TBB) of a first number of TBBs, according to at least one of a first transmission timing, which is based on a completed transmission timing of the TBB and a timing offset, a second transmission timing, which is based on a feedback corresponding to a previous TBB of the TBB, and a third transmission timing, which is based on at least one of a completed transmission timing of a last TBB of the first number of TBBs, the timing offset, a feedback order for the first number of TBBs, and a transmission repetition number for a feedback, wherein, the TBB includes a second number of TBs, which is a positive integer; and then receives the feedback corresponding to the TBB of the first number of TBBs according to the determined transmission timing.

In another aspect, it should also be understood that the scaling of the transmission repetition number for a TBB indicated by DCI, as well as the interleaved transmission for the feedbacks (bundles), can be applied through all of the embodiments of the present application.

One skilled in the relevant art will recognize that the process described in FIG. 4B or 5B does not need to be practiced in the sequence shown in the Figures and may be practiced without one or more of the specific steps or with other steps not shown in the Figures.

Figure 6:
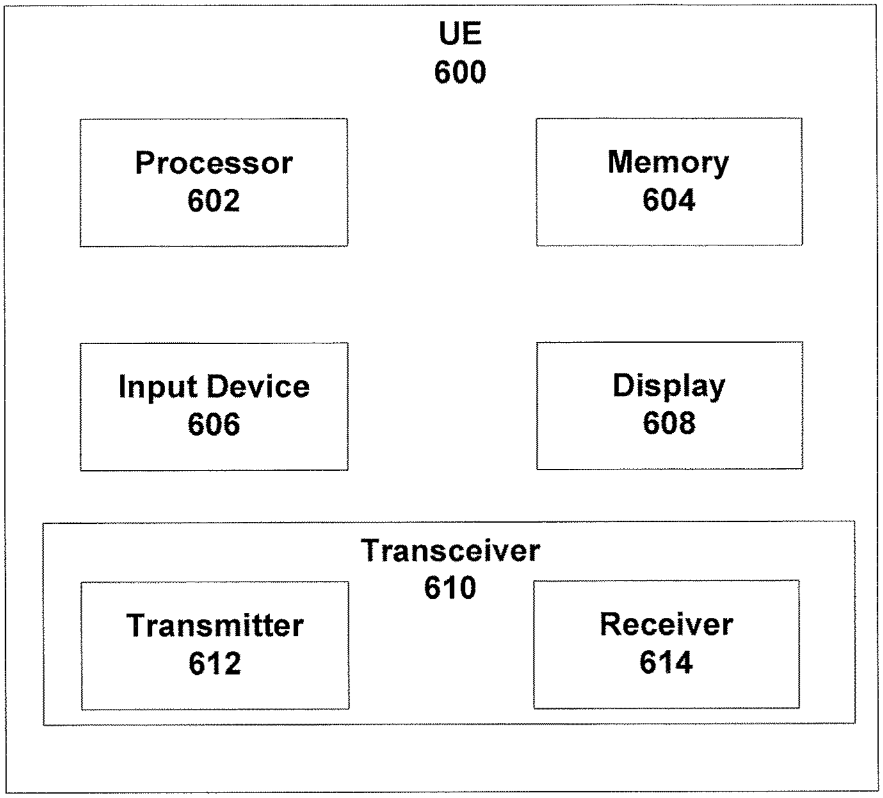
FIG. 6 is a schematic block diagram illustrating components of a UE such as UE according to one embodiment.

FIG. 6 is a schematic block diagram illustrating components of a UE such as BL/CE UEs according to one embodiment.

UE 600 is an embodiment of the UE described from FIG. 1A to FIG. 5B. Furthermore, UE 600 may include a processor 602, a memory 604, and a transceiver 610. In some embodiments, UE 600 may include an input device 606 and/or a display 608. In certain embodiments, the input device 606 and the display 608 may be combined into a single device, such as a touch screen.

The processor 602, in one embodiment, may include any known controller capable of executing computer-readable instructions and/or capable of performing logical operations. For example, the processor 602 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 602 executes instructions stored in the memory 604 to perform the methods and routines described herein. The processor 602 is communicatively coupled to the memory 604, the input device 606, the display 608, and the transceiver 610.

In some embodiments, the processor 602 controls the transceiver 610 to receive various configuration and data from Network Equipment 700. In certain embodiments, the processor 602 may monitor DL signals received via the transceiver 610 for specific messages.

The memory 604, in one embodiment, is a computer readable storage medium. In some embodiments, the memory 604 includes volatile computer storage media. For example, the memory 604 may include a RAM, including dynamic RAM ("DRAM"), synchronous dynamic RAM ("SDRAM"), and/or static RAM ("SRAM"). In some embodiments, the memory 604 includes non-volatile computer storage media. For example, the memory 604 may include a hard disk drive, a flash memory, or any other suitable non-volatile computer storage device. In some embodiments, the memory 604 includes both volatile and non-volatile computer storage media. In some embodiments, the memory 604 stores data relating to scheduling information for the transmission of TBs from Network Equipment 700. In some embodiments, the memory 604 also stores program code and related data, such as an operating system or other controller algorithms operating on UE 600.

UE 600 may optionally include an input device 606. The input device 606, in one embodiment, may include any known computer input device including a touch panel, a button, a keyboard, a stylus, a microphone, or the like. In some embodiments, the input device 606 may be integrated with the display 608, for example, as a touch screen or similar touch-sensitive display. In some embodiments, the input device 606 includes a touch screen such that text may be input using a virtual keyboard displayed on the touch screen and/or by handwriting on the touch screen. In some embodiments, the input device 606 includes two or more different devices, such as a keyboard and a touch panel. In certain embodiments, the input device 606 may include one or more sensors for monitoring an environment of UE 600.

UE 600 may optionally include a display 608. The display 608, in one embodiment, may include any known electronically controllable display or display device. The display 608 may be designed to output visual, audible, and/or haptic signals. In some embodiments, the display 608 includes an electronic display capable of outputting visual data to a user. For example, the display 608 may include, but is not limited to, an LCD display, an LED display, an OLED display, a projector, or a similar display device capable of outputting images, text, or the like to a user. As another, non-limiting, example, the display 608 may include a wearable display such as a smart watch, smart glasses, a heads-up display, or the like. Further, the display 608 may be a component of a smart phone, a personal digital assistant, a television, a table computer, a notebook (laptop) computer, a personal computer, a vehicle dashboard, or the like.

In certain embodiments, the display 608 may include one or more speakers for producing sound. For example, the display 608 may produce an audible alert or notification (e.g., a beep or chime). In some embodiments, the display 608 includes one or more haptic devices for producing vibrations, motion, or other haptic feedback. In some embodiments, all or portions of the display 608 may be integrated with the input device 606. For example, the input device 606 and display 608 may form a touch screen or similar touch-sensitive display. In other embodiments, the display 608 may be located near the input device 606.

The transceiver 610, in one embodiment, is configured to communicate wirelessly with Network Equipment 700. In certain embodiments, the transceiver 610 comprises a transmitter 612 and a receiver 614. The transmitter 612 is used to transmit UL communication signals to Network Equipment 700 and the receiver 614 is used to receive DL communication signals from Network Equipment 700. For example, the transmitter 612 may transmit feedbacks corresponding to one or more DL transmissions. As another example, the receiver 614 may receive various configurations/data from Network Equipment 700.

The transmitter 612 and the receiver 614 may be any suitable types of transmitters and receivers. Although only one transmitter 612 and one receiver 614 are illustrated, the transceiver 610 may have any suitable number of transmitters 612 and receivers 614. For example, in some embodiments, UE 600 includes a plurality of transmitter 612 and receiver 614 pairs for communicating on a plurality of wireless networks and/or radio frequency bands, each transmitter 612 and receiver 614 pair configured to communicate on a different wireless network and/or radio frequency band than the other transmitter 612 and receiver 614 pairs.

Figure 7:
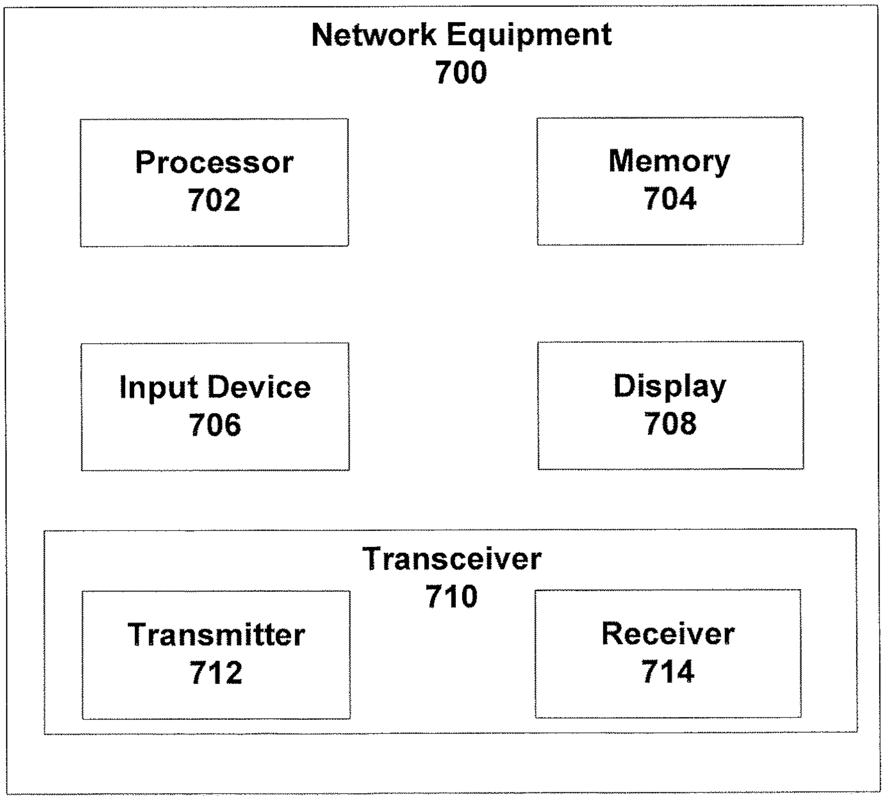
FIG. 7 is a schematic block diagram illustrating components of a network equipment according to one embodiment.

FIG. 7 is a schematic block diagram illustrating components of a network equipment according to one embodiment.

Network Equipment 700 includes one embodiment of eNB/gNB described from FIG. 1A to FIG. 5B. Furthermore, Network Equipment 700 may include a processor 702, a memory 704, an input device 706, a display 708, and a transceiver 710. As may be appreciated, the processor 702, the memory 704, the input device 706, and the display 708 may be substantially similar to the processor 702, the memory 704, the input device 706, and the display 708 of UE 600, respectively.

In some embodiments, the processor 702 controls the transceiver 710 to transmit DL signals/data to UE 600. The processor 702 may also control the transceiver 710 to receive UL signals/data from UE 600. For example, the processor 702 may control the transceiver 710 to receive feedbacks corresponding to one or more DL transmissions. In another example, the processor 702 may control the transceiver 710 to transmit a DL signals for various configurations to UE 800, as described above.

The transceiver 710, in one embodiment, is configured to communicate wirelessly with UE 600. In certain embodiments, the transceiver 710 comprises a transmitter 712 and a receiver 714. The transmitter 712 is used to transmit DL communication signals to UE 600 and the receiver 714 is used to receive UL communication signals from UE 600. For example, the receivers 714 may receive feedbacks corresponding to DL TB from UE 600. As another example, the transmitter 712 may transmit the various configurations/data of Network Equipment 700.

The transceiver 710 may communicate simultaneously with a plurality of UE 600. For example, the transmitter 712 may transmit DL communication signals to UE 600. As another example, the receiver 714 may simultaneously receive UL communication signals from UE 600. The transmitter 712 and the receiver 714 may be any suitable types of transmitters and receivers. Although only one transmitter 712 and one receiver 714 are illustrated, the transceiver 710 may have any suitable number of transmitters 712 and receivers 714. For example, Network Equipment 700 may serve multiple cells and/or cell sectors, wherein the transceiver 710 includes a transmitter 712 and a receiver 714 for each cell or cell sector.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
- at least one memory; and
- at least one processor coupled with the at least one memory and configured to cause the UE to:
  - determine a transmission timing for a feedback corresponding to a transport block bundle of a first number of transport block bundles, to by determining one of:
  - the later of:
    - a first transmission timing, which is based on a completed transmission timing for the transport block bundle and a timing offset between the completed transmission timing and the transmission timing for the feedback; and
    - a second transmission timing, which is based on a transmission timing of a second feedback, the second feedback corresponding to a previous transport block bundle of the first number of transport block bundles, wherein determining the later of the first transmission timing and the second transmission timing comprises comparing a timing index associated with the first transmission timing and a timing index associated with the second transmission timing and selecting the transmission timing having a greater timing index, such that transmission of the feedback corresponding to the transport block bundle is deferred; or the later of the first transmission timing and a third transmission timing, wherein:

the third transmission timing is based on at least two of a completed transmission timing for a last transport block bundle of the first number of transport block bundles, the timing offset, a completed transmission timing for the first number of transport block bundles, a feedback order for the first number of transport block bundles, and a transmission repetition number for the feedback; and determining the later of the first transmission timing and the third transmission timing comprises comparing a timing index associated with the first transmission timing and a timing index associated with the third transmission timing and selecting the transmission timing having a greater timing index;

wherein the transport block bundle includes a second number of transport blocks, wherein the second number is a positive integer; and transmit the feedback corresponding to the transport block bundle of the first number of transport block bundles according to the determined transmission timing.

2. The UE of claim 1, wherein feedbacks corresponding to the first number of transport block bundles are transmitted in an interleaved way.

3. The UE of claim 1, wherein, if the transport block bundle includes at least two transport blocks, the feedback refers to a feedback bundle corresponding to the transport block bundle.

4. The UE of claim 3, wherein the feedback bundle is determined by an AND operation of feedbacks corresponding to the second number of transport blocks.

5. The UE of claim 3, wherein the feedback bundle is determined by a modulation operation of feedbacks corresponding to the second number of transport blocks, wherein a modulation factor is based on the second number of transport blocks.

6. A base station, comprising:

at least one memory; and at least one processor coupled with the at least one memory and configured to cause the base station to:

determine a transmission timing for a feedback corresponding to a transport block bundle of a first number of transport block bundles, by determining one of:

the later of:

a first transmission timing, which is based on a completed transmission timing for the transport block bundle and a timing offset between the completed transmission timing and the transmission timing for the feedback; and a second transmission timing, which is based on a transmission timing of a second feedback, the second feedback corresponding to a previous transport block bundle of the first number of transport block bundles, wherein determining the later of the first transmission timing and the second transmission timing comprises comparing a timing index associated with the first transmission timing and a timing index associated with the second transmission timing and selecting the transmission timing having a greater timing index, such that transmission of the feedback corresponding to the transport block bundle is deferred; or the later of the first transmission timing and a third transmission timing, wherein:

the third transmission timing is based on at least two of a completed transmission timing for a last transport block bundle of the first number of transport block bundles, the timing offset, a completed transmission timing for the first number of transport block bundles, a feedback order for the first number of transport block bundles, and a transmission repetition number for the feedback; and determining the later of the first transmission timing and the third transmission timing comprises comparing a timing index associated with the first transmission timing and a timing index associated with the third transmission timing and selecting the transmission timing having a greater timing index;

wherein the transport block bundle includes a second number of transport blocks, wherein the second number is a positive integer; and receive the feedback corresponding to the transport block bundle of the first number of transport block bundles according to the determined transmission timing.

7. The base station of claim 6, wherein feedbacks corresponding to the first number of transport block bundles are transmitted in an interleaved way.

8. The base station of claim 6, wherein, if the transport block bundle includes at least two transport blocks, the feedback refers to a feedback bundle corresponding to the transport block bundle.

9. The base station of claim 8, wherein the feedback bundle is determined by an AND operation of feedbacks corresponding to the second number of transport blocks.

10. The base station of claim 8, wherein the feedback bundle is determined by a modulation operation of feedbacks corresponding to the second number of transport blocks, wherein a modulation factor is based on the second number of transport blocks.

11. A method performed by a base station, the method comprising:

determining a transmission timing for a feedback corresponding to a transport block bundle of a first number of transport block bundles, by determining one of:

the later of:

a first transmission timing, which is based on a completed transmission timing for the transport block bundle and a timing offset between the completed transmission timing and the transmission timing for the feedback; and a second transmission timing, which is based on a transmission timing of a second feedback, the second feedback corresponding to a previous transport block bundle of the first number of transport block bundles, wherein determining the later of the first transmission timing and the second transmission timing comprises comparing a timing index associated with the first transmission timing and a timing index associated with the second transmission timing and selecting the transmission timing having a greater timing index, such that transmission of the feedback corresponding to the transport block bundle is deferred; or the later of the first transmission timing and a third transmission timing, wherein:

the third transmission timing is based on at least two of a completed transmission timing for a last transport block bundle of the first number of transport block bundles, the timing offset, a completed transmission timing for the first number of transport block bundles, a feedback order for the first number of transport block bundles, and a transmission repetition number for the feedback; and determining the later of the first transmission timing and the third transmission timing comprises comparing a timing index associated with the first transmission timing and a timing index associated with the third transmission timing and selecting the transmission timing having a greater timing index;

wherein the transport block bundle includes a second number of transport blocks, wherein the second number is a positive integer; and receiving the feedback corresponding to the transport block bundle of the first number of transport block bundles according to the determined transmission timing.

12. The method of claim 11, wherein feedbacks corresponding to the first number of transport block bundles are transmitted in an interleaved way.

13. The method of claim 11, wherein, if the transport block bundle includes at least two transport blocks, the feedback refers to a feedback bundle corresponding to the transport block bundle.

14. A method performed by a user equipment (UE), the method comprising:

determining a transmission timing for a feedback corresponding to a transport block bundle of a first number of transport block bundles, according to by determining one of:

the later of:

a first transmission timing, which is based on a completed transmission timing for the transport block bundle and a timing offset between the completed transmission timing and the transmission timing for the feedback; and a second transmission timing, which is based on a transmission timing of a second feedback, the second feedback corresponding to a previous transport block bundle of the first number of transport block bundles, wherein determining the later of the first transmission timing and the second transmission timing comprises comparing a timing index associated with the first transmission timing and a timing index associated with the second transmission timing and selecting the transmission timing having a greater timing index, such that transmission of the feedback corresponding to the transport block bundle is deferred; or the later of the first transmission timing and a third transmission timing, wherein:

the third transmission timing is based on at least two of a completed transmission timing for a last transport block bundle of the first number of transport block bundles, the timing offset, a completed transmission timing for the first number of transport block bundles, a feedback order for the first number of transport block bundles, and a transmission repetition number for the feedback; and determining the later of the first transmission timing and the third transmission timing comprises comparing a timing index associated with the first transmission timing and a timing index associated with the third transmission timing and selecting the transmission timing having a greater timing index;

wherein the transport block bundle includes a second number of transport blocks, wherein the second number is a positive integer; and transmitting the feedback corresponding to the transport block bundle of the first number of transport block bundles according to the determined transmission timing.

* * * * *